United States Patent
Smith

(10) Patent No.: US 8,277,949 B2
(45) Date of Patent: Oct. 2, 2012

(54) USE OF THERMOPLASTIC POLYURETHANES IN RUBBER MODIFIED BITUMEN ROOFING MEMBRANES

(75) Inventor: Jason Smith, Strongsville, OH (US)

(73) Assignee: Garland Industries, Inc., Cleveland, OH (US)

( * ) Notice: Subject to any disclaimer, the term of this patent is extended or adjusted under 35 U.S.C. 154(b) by 376 days.

(21) Appl. No.: 12/567,875

(22) Filed: Sep. 28, 2009

(65) Prior Publication Data

US 2010/0297902 A1    Nov. 25, 2010

Related U.S. Application Data

(60) Provisional application No. 61/180,568, filed on May 22, 2009.

(51) Int. Cl.
*B32B 11/02* (2006.01)
(52) U.S. Cl. ........................................ 428/489
(58) Field of Classification Search .......... 428/489
See application file for complete search history.

(56) References Cited

U.S. PATENT DOCUMENTS

| | | | | |
|---|---|---|---|---|
| 3,625,804 | A | * | 12/1971 | Losey et al. .................... 156/575 |
| 3,846,362 | A | * | 11/1974 | Reinecke et al. ............... 524/66 |
| 3,880,789 | A | * | 4/1975 | Ishihara et al. ............... 524/705 |
| 3,980,597 | A | * | 9/1976 | Shihadeh ....................... 524/705 |
| 5,319,008 | A | * | 6/1994 | Janoski ........................... 524/59 |
| 5,421,876 | A | * | 6/1995 | Janoski ........................ 106/278 |
| 5,981,010 | A | * | 11/1999 | Terry et al. .................... 428/40.1 |
| 6,742,313 | B2 | * | 6/2004 | Ritland et al. .................... 52/408 |
| 7,317,051 | B2 | * | 1/2008 | Georgeau et al. ............. 524/837 |
| 7,374,816 | B2 | | 5/2008 | Bindschedler et al. |
| 2001/0051676 | A1 | * | 12/2001 | Rajalingam et al. ............ 524/59 |
| 2005/0197025 | A1 | | 9/2005 | Hallam et al. |
| 2007/0065630 | A1 | | 3/2007 | Horne et al. |
| 2008/0182925 | A1 | * | 7/2008 | Wang et al. ..................... 524/66 |

FOREIGN PATENT DOCUMENTS

EP    1985775    * 10/2008

* cited by examiner

*Primary Examiner* — Peter Szekely

(74) *Attorney, Agent, or Firm* — Fay Sharpe LLP; Brian E. Turung

(57) ABSTRACT

A roofing membrane that includes a blend of thermoplastic polyurethane and petroleum liquid so as to improve the UV stability of the blend without adversely affecting the flexibility of the dried and/or cured blend.

34 Claims, No Drawings

USE OF THERMOPLASTIC POLYURETHANES IN RUBBER MODIFIED BITUMEN ROOFING MEMBRANES

The present invention claims priority on U.S. Provisional Application Ser. No. 61/180,568 filed May 22, 2009, which is incorporated herein by reference.

The present invention is directed to a mixture that includes thermoplastic polyurethane which is blended with asphalt, bitumen, modified bitumen, and/or coal-tar to improve the ultraviolet light stability of the blend, and more particularly to a roofing material that includes thermoplastic polyurethane blended with asphalt, bitumen, modified bitumen, and/or coal-tar, which roofing membrane has improved the ultraviolet light stability while substantially maintaining the flexibility properties of the asphalt, bitumen, modified bitumen, and/or coal-tar. The roofing material of the present invention can be used to form flexible prefabricated roofing membranes and/or be applied directly to a roof surface.

BACKGROUND OF THE INVENTION

Flexible roofing membranes are commonly formed of bitumen that has been modified by thermoplastic polymers such as block elastomers (SBS—Styrene Butadiene Styrene, SEBS—Styrene Ethylene Butadiene Styrene) or plastomers (Polyolefin such as PPA, EVA, PPI, APAO—Amorphous a polyolefin). The modification of bitumen results in a bitumen mixture having a softening point of about 120-130° C. and also being flexible at temperatures below 0° C.

Typically, membranes made from bitumen that has been modified are sensitive to UV light thereby causing increased rates of degrading of such bitumen mixture. In the past, this limitation of bitumen that has been modified has been addressed by adding metal particles and/or granules to the modified bitumen mixture and/or by adding metal particles and/or granules on the top surface of the bitumen mixture. In addition to UV light sensitivity, certain bitumens that have been modified are susceptible to increased rates of oxidation, thus causing the bitumen mixture to degrade and compromise the seal formed by the bitumen membrane. As such, many membranes that are formed by bitumen that has been modified require resealing every 15-20 years.

A modification of bitumen that has improved UV light sensitivity is disclosed in U.S. Pat. No. 7,374,816, which is incorporated herein by reference. The '816 patent discloses a bitumen base composition that includes 40-90 wt. % bitumen, 10-50 wt. % thermoplastic polyurethane, 0-10 wt. % aromatic oil, 0-50 wt. % filler, and 0-0.5 wt. % catalyst. The '816 patent discloses that the thermoplastic polyurethane is formed in situ in the bitumen base composition. Although the '816 patent discloses that the inclusion of aromatic oil is optional, the absence of such aromatic oil in the bitumen base composition will result in a very inflexible bitumen base composition. As such, a significant amount of naphthenic or aromatic oils must be added to the bitumen to maintain the flexibility of the bitumen base composition. Unfortunately, the use of naphthenic and aromatic oils can be environmentally unfriendly and can also be unpleasant to use. In addition, these oils, while acting like plasticizers to improve the cold temperature properties of the bitumen base composition, have a tendency over time to defuse out of the bitumen base composition and escape from the surface of the bitumen base composition, thus leaving the bitumen base composition in a more brittle condition than when the bitumen base composition was first applied.

In view of the current state of the art of bitumen coatings that have been modified, there is a need for an improved bitumen composition that resists UV degradation and maintains its flexibility.

SUMMARY OF THE INVENTION

The present invention is directed to a mixture that includes thermoplastic polyurethane which is blended with a petroleum liquid to improve the ultraviolet light stability of the blend. The mixture of the present invention can be used as a roofing material to form flexible prefabricated roofing membranes to form a water-proof or water resistant roofing membrane and/or be applied directly to a roof surface to form a water-proof or water resistant seal on the top surface of the roof surface. As can be appreciated, the mixture of the present invention can be used in other applications to form a water-proof or water resistant seal. For purposes of this invention, the term "petroleum liquid" will be hereinafter used to generically refer to all types of asphalt, modified asphalt, bitumen, modified bitumen, coal-tar, modified coal tar, or any mixture thereof, unless a specific type of asphalt, modified asphalt, bitumen, modified bitumen, coal-tar, or modified coal tar is referenced. The present invention will also be described with particular reference to roofing materials or coatings for use on roof surfaces; however, it will be appreciated that the mixture of the present invention can be used in many other applications.

In one non-limiting application of the present invention, the mixture of the present invention can be used to coat and/or partially or fully impregnate a fabric material for a prefabricated roofing membrane. The fabric or mat material can be formed of woven and/or non-woven fibers. The fabric or mat material can be a reinforced fabric; however, this is not required. The woven and/or non-woven fibers of the fabric or mat material can be held in position by a stitched or knitted thread, melted bonding, etc. The prefabricated roofing material can include one or more layers of fabric or mat material. Non-limiting examples of fabric or mat material that can be used to form prefabricated roofing membrane are disclosed in United States Patent Publication Nos. 2005/0197025 and 2007/0065630 and in the prior art cited in these patent publications, all of which are incorporated fully herein by reference. The mixture of the present invention can be used to partially or fully impregnate all of or only a portion of the fabric or mat material by one or more processes such as, but not limited to, a dipping process and/or a spray coating process; however, other or additional coating processes can be used. Granules and/or metal flakes can be applied to the top surface of the prefabricated roofing material; however, this is not required. The mixture of the present invention is formulated to have a) good UV light resistance, b) good resistance to oxidation and aging when the mixture is exposed to ambient conditions, and c) a similar flexibility as compared to bitumen that has been modified and has been used in the past to coat and impregnate a prefabricated roofing material.

In another and/or alternative non-limiting application of the present invention, the mixture of the present invention can be used as a coating on the top surface of a roofing system. One non-limiting application is the use of the mixture of the present invention on a built-up-roof system (BUR). The mixture of the present invention can be mopped on, sprayed on, or otherwise applied to the top surface of a roof system of a building structure to form a water-resistant or water-proofing coating on the top surface of the roof system. Granules and/or metal flakes can be applied to the top surface of the roof system after the mixture of the present invention is applied to the top surface of the roof system; however, this is not required. The mixture of the present invention is formulated to have a) good UV light resistance, and b) good resistance to oxidation and aging when the mixture is exposed to ambient conditions.

In another and/or alternative non-limiting application of the present invention, the mixture of the present invention has a general formula of 30-80 wt. % petroleum liquid, 0.5-40 wt. % polymer, 0.1-25 wt. % thermoplastic urethane (TPU), 0-69.4 wt. % filler and other additives. The petroleum liquid can be asphalt, modified asphalt, bitumen, modified bitumen, coal-tar, and/or modified coal tar. The polymer can include, but is not limited to, APAO (Amorphous Polyolefin), APP (Atactic Polypropylene), EVA (Ethylene Vinyl Acetate), PPA (Polyphthalamide), PPI (Polymeric Polyisocyanate), SEBS (Styrene Ethylene Butadiene Styrene), SBS (Styrene Butadiene Styrene), and/or SIS (Styrene-Isoprene-Styrene). Generally the polymer is a thermoplastic polymer; however, this is not required. When SBS is used, it has been found that oil-extended SBS works better than non-oil extended SBS. The thermoplastic urethane can include, but is not limited to, Polyether backbone TPU, Polyester backbone TPU, Polyether/Polyester backbone TPU, and/or Polycarbonate backbone TPU. The TPU is generally in solid form (e.g., pellet form, etc.) when added to the mixture; however, this is not required. Non-limiting examples of TPU available in solid form are commercially offered by Bayer AG (Desmopan, Texin, etc.) and BASF Corporation (Elastollan, etc.). When the TPU is added in solid form, the TPU has already been reacted and cured, thus the TPU is not formed in situ in the mixture as in mixture disclosed in U.S. Pat. No. 7,374,816. As such, the TPU is easier to handle and store during the formation of the mixture of the present invention. The fillers and/or additives that can be included in the mixture of the present invention are optional. Furthermore, the types of fillers and/or additives that can be added to the mixture are numerous. Non-limiting fillers and/or additives that can be used include alumina trihydrate (ATH), calcium carbonate, chalk, clay, dolomite, kaolin, reinforced fibers (e.g., Kevlar®, carbon fibers, fiberglass, boron fibers, etc.) silica, and/or talc. Other additives that can be used include, but are not limited to, coloring agents, metal flakes, UV resistance agents, adhesion enhancers, fire retardants, biocides, and/or oils and other softening agents.

In still another and/or alternative non-limiting application of the present invention, when the TPU of the mixture of the present invention is to be partially or fully formed during the blending of the components of the mixture of the present invention (i.e., TPU formed at least partially in situ), then the one or two-component moisture-curing polyurethane is generally used; however, this is not required. In one non-limiting embodiment of the invention, the polyurethane is a one-component, moisture-curing polyurethane based on acrylate and/or methacrylate polymers or copolymers. In one non-limiting formulation of the invention, the moisture-curing polyurethane includes diisocyanate of a functionality at least 1 (e.g., 1.9-2.2, etc.), of polyol of a functionality of at least 1 (e.g., 1.9-2.2, etc.), and of a chain lengthening agent. The one or more polyols used can be selected from polyesters, polyethers and/or polycarbonates of a functionality of at least 1 and of molecular weights of at last 500. The chain lengthener can include a diol of a molecular weight of at least 40 (e.g., 1,4-butanediol, hexanediol, neopentylglycol, 2-ethyl, 1,3-hexanediol, etc.). In another non-limiting formulation of the invention, the moisture-curing polyurethane includes at least one reaction product with reactive isocyanate groups that are obtained by reaction of at least one di- or polyisocyanate with one or more polyether-polyols, partly crystalline or crystalline polyester-polyols and/or low molecular weight polymers from olefinically unsaturated monomers, and/or optionally tackifying resins. The monomeric di- or polyisocyanates suitable for the preparation of the polyurethane generally are those aromatic, aliphatic or cycloaliphatic diisocyanates having molecular weights of up to about 500; however, higher molecular weights can be used. Non-limiting examples of suitable aromatic diisocyanates include isomers of toluoylene diisocyanate (TDI), naphthalene 1,5-diisocyanate (NDI), naphthalene 1,4-diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Non-limiting examples of cycloaliphatic diisocyanates include 4,4'-dicyclohexylmethane diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, pTMXDI) and dimer fatty acid diisocyanate. Non-limiting examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}$DI).y used. Non-limiting examples of polypropylene glycols or polybutylene glycols which can be used include di- and/or trifunctional polypropylene glycols with two or more hydroxyl groups per molecule in the molecular weight range from 400-20,000. Random and/or block copolymers of ethylene oxide and propylene oxide can also be employed. Another group of polyethers which can be used are polytetramethylene glycols (polybutylene glycols, poly(oxytetramethylene)glycol, poly-THF), wherein the molecular weight range of the polytetramethylene glycols are from 600-6,000. Instead of or additional to polyether-polyols, low molecular weight polyols, alkylene diols (e.g., butanediol, hexanediol, octanediol, decanediol, dodecanediol, etc.) can also be used. Non-limiting examples of polyester-polyols that can be used are the crystalline or partly crystalline polyester-polyols which can be prepared by condensation of di- or tricarboxylic acids (e.g., adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, etc.), dimer fatty acid with low molecular weight diols or triols (e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, etc.). One non-limiting specific example of a polyurethane that can be used in the blend of the present invention includes at least about 2 weight percent of a diisocyanate, at least about 10 weight percent of a difunctional polypropylene glycol with a molecular weight of from about 1,000-8,000, at least about 0.5 weight percent of a polypropylene glycol or alkylene diol with a molecular weight from about 100-900, at least about 5 weight percent of a crystalline or partly crystalline polyester-polyol, at least about 2 weight percent of a low molecular weight polymer of olefinically unsaturated monomers, at least about 0.1 weight percent of a hydroxylated tackifying resin, and at least 0.005 weight percent of an acid stabilizer. Another non-limiting non-limiting specific example of a polyurethane that can be used in the blend of the present invention includes at least 5 weight percent of a diisocyanate, at least about 15 weight percent of a difunctional polypropylene glycol with a molecular weight of from about 1,500-7,000, at least about 1 weight percent of a polypropylene glycol or alkylene diol with a molecular weight from about 150-800, at least about 10 weight percent of a crystalline or partly crystalline polyester-polyol, at least about 5 weight percent of a low molecular weight polymer of olefinically unsaturated monomers, at least about 1 weight percent of a hydroxylated tackifying resin, and at least about 0.01 weight percent of an acid stabilizer. Still another non-limiting specific example of a polyurethane that can be used in the blend of the present invention includes about 5-15 weight percent of a diisocyanate, about 20-40 weight percent of a difunctional polypropylene glycol with a molecular weight of from about 2,000-6,000, about 2-8 weight percent of a polypropylene glycol or alkylene diol with a molecular weight from about 200-600, about 15-30 weight percent of a crystalline or partly crystalline polyester-polyol, about 10-35 weight percent of a low molecular weight polymer of olefinically unsaturated monomers, about 2-8 weight percent of a hydroxylated tackifying resin, and about 0.01-0.1 weight percent of an acid stabilizer. Yet non-limiting specific example of a polyurethane that can be used in the blend of the present invention includes at least one reaction product with reactive NCO groups produced by reaction of i) about 5-15 weight percent of at least one di- or polyisocyanate; ii) about 20-40 weight percent difunctional polypropylene glycol having a molecular weight of from about 2,000 to 6,000; iii) about 15-30 weight percent of at least one crystalline or partly crystalline polyester-polyol; iv) about 10-35 weight percent of at least one low molecular weight polymer obtained by polymerization of one or more olefinically unsaturated monomers; v) about 2-8 weight percent of a polypropylene glycol or alkylene diol having a molecular weight of from about 200 to 600; and iv) about 2-8 weight percent of a tackifying resin and/or catalyst. Still yet another non-limiting specific example of a polyurethane that can be used in the blend of the present invention includes i) a reactive, moisture-curable polyurethane; and ii) a catalytically effective amount comprising at least about 0.005 weight percent of at least one tertiary amine non-fugitive catalyst containing at least one active hydrogen, that provides at least one functional group that is capable of reacting with one or more isocyanate groups in a polyurethane prepolymer. In one non-limiting formulation of this embodiment, the polyurethane includes polyols.

In yet another and/or alternative non-limiting application of the present invention, the petroleum liquid that is used in the mixture of the present invention can have a wide range of softening points and penetrations. In one embodiment of the invention, the petroleum liquid has a penetration value of 2-30 and a softening point of about 130° F.-190° F. In another non-limiting embodiment of the invention, the petroleum liquid has a penetration value of 2-25 and a softening point of about 150° F.-180° F. Grades of petroleum liquid that can be used in the mixture of the present invention include, but are not limited to, 30/40, 60/70, 80/100, and 180/220.

One non-limiting object of the present invention is the provision of a novel mixture that is a blend of petroleum liquid, polymer and thermoplastic polymer.

Another and/or alternative non-limiting object of the present invention is the provision of a novel mixture that is a blend of petroleum liquid, polymer and thermoplastic polymer that has good UV resistance.

Still another and/or alternative non-limiting object of the present invention is the provision of a novel mixture that is a blend of petroleum liquid, polymer and thermoplastic polymer that has good resistance to oxidation and aging when the mixture is exposed to ambient conditions.

Yet another and/or alternative non-limiting object of the present invention is the provision of a novel mixture that is a blend of petroleum liquid, polymer and thermoplastic polymer that has a similar flexibility as compared to bitumen that has been modified and has been used in the past to coat and impregnate prefabricated roofing material.

Still yet another and/or alternative non-limiting object of the present invention is the provision of a novel mixture that is a blend of petroleum liquid, polymer and thermoplastic polymer that does not require any extender oils to maintain the cold temperature flexibility properties of the novel mixture.

Another and/or alternative non-limiting object of the present invention is the provision of a novel mixture that is a blend of petroleum liquid, polymer and solid thermoplastic polymer.

Still another and/or alternative non-limiting object of the present invention is the provision of a novel mixture that is a blend of petroleum liquid, block polymer and/or plastomer, and thermoplastic polymer.

These and other advantages will become apparent to those skilled in the art upon the reading and following of this description.

DESCRIPTION OF NON-LIMITING EMBODIMENTS

The present invention is directed to a novel mixture of petroleum liquid, polymer, and thermoplastic urethane (TPU) to form a material that has a) good UV light resistance, b) good resistance to oxidation and aging when the mixture is exposed to ambient conditions, and c) a similar flexibility as compared to bitumen that has been modified and has been used in the past to coat and impregnate prefabricated roofing material. The novel mixture of the present invention as a roofing material to form flexible prefabricated roofing membranes to form a water-proof or water resistant roofing membrane and/or be applied directly to a roof surface to form a water-proof or water resistant seal on the top surface of the roof surface. The use of TPU has been found to impart one or more of the following properties to the mixture of the present invention 1) Good hydrolytic stability, 2) Resistance of solvents and fungus attack, 3) Excellent abrasion resistance, 4) High tensile, compressive and tear strength, 5) Providing improved UV stability. Non-limiting formulations of the novel mixture of the present invention is as follows:

Example 1

| | |
|---|---|
| Petroleum Liquid | 30-80 wt. % |
| Polymer | 1-40 wt. % |
| TPU | 0.1-15 wt. % |
| Filler/Additive | 0-68.9 wt. % |

Example 2

| | |
|---|---|
| Petroleum Liquid | 30-80 wt. % |
| Polymer | 1-40 wt. % |
| TPU | 0.1-9 wt. % |
| Filler/Additive | 0-68.9 wt. % |

Example 3

| | |
|---|---|
| Petroleum Liquid | 30 to less than 40 wt. % |
| Polymer | 1-40 wt. % |
| TPU | 0.1-15 wt. % |
| Filler/Additive | 6-68.9 wt. % |

Example 4

| | |
|---|---|
| Petroleum Liquid | 30-80 wt. % |
| Polymer | 1-25 wt. % |
| TPU | 0.5-15 wt. % |
| Filler/Additive | 0-68.5 wt. % |

Example 5

| | |
|---|---|
| Asphalt | 30-75 wt. % |
| APP, SEBS, SBS and/or SIS | 5-20 wt. % |
| TPU | 0.5-10 wt. % |
| Filler/Additive | 0-64.5 wt. % |

Example 6

| | |
|---|---|
| Asphalt PG-6422 | 30-70 wt. % |
| SEBS and/or SBS | 8-18 wt. % |
| Polyether backbone TPU | 1-9 wt. % |
| Filler/Additive | 4-50 wt. % |

Example 7

| | |
|---|---|
| Asphalt PG-6422 | 35-65 wt. % |
| SBS | 10-16 wt. % |
| Polyether backbone TPU | 2-8 wt. % |
| Filler/Additive | 12-50 wt. % |

Example 8

| | |
|---|---|
| Asphalt PG-6422 | 40-50 wt. % |
| Kraton D1101KG | 10-15 wt. % |
| Elastollan 1185 | 2-6 wt. % |
| CaCO$_3$, Clay, Dolomite and/or Talc | 30-48 wt. % |

In Examples 1-4, the novel mixture of the present invention can include petroleum liquid in the form of asphalt, modified asphalt, bitumen, modified bitumen, coal-tar, and/or modified coal tar. When the petroleum liquid is asphalt or modified asphalt, the grades of asphalt and/or modified asphalt that can be used include, but are not limited to, 30/40, 60/70, 80/100, and 180/220. Example 5 limits the type of petroleum liquid to asphalt. Examples 6-8 further limit the type of petroleum liquid to Asphalt PG-6422, a paving grade asphalt. Examples 1-4 do not limit the polymer to a certain type of polymer; however, the polymer typically includes or is completely formed of block polymer and/or plastomer such as APAO, APP, EVA, PPA, PPI, SEBS, SBS, and/or SIS. Examples 5-7 limit the polymer to one or more specific types of polymers. Example 8 identifies a specific type of oil extended SBS polymer commercially available from Kraton Polymers U.S. LLC. Examples 1-5 do not limit the type of TPU in the novel mixture. Examples 6-7 limit the TPU to a particular type of TPU. The TPU in Examples 1-7 can be added to the novel mixture in solid form and/or can be formed in situ in the mixture. Example 8 identified a solid TPU having a polyether backbone that is commercially available from BASF Corporation. This type of TPU is available in pellet form. The pellets of TPU make handling of the TPU and processing of the novel mixture easier, thus eliminating the need for special equipment for producing a polyurethane. Furthermore, during the reaction to form a polyurethane prepolymer, the diisocyanate reactive sites are seeking hydroxyl groups. Premature addition of the components of a polyurethane to the petroleum liquid during the formation of the novel mixture can introduce reactive groups found in the asphalt that consume a portion of the diisocyanates, which can lower the diisocyanate/hydroxyl ratio and change the properties of the final novel mixture. The use of pellets of TPU eliminates such handle problems and reaction concerns. Examples 1-7 do not limit the type of filler and/or additive that is included in the novel mixture of the present invention; however, Example 8 limits the types of filler and/or additive that is included in the novel mixture of the present invention.

As illustrated in Examples 4-8, the weight percent of petroleum liquid in the novel mixture is generally greater than the weight percent of the polymer in the novel mixture; however, this is not required. When the weight percent of the petroleum liquid is greater than the weight percent of the polymer in the novel mixture, the weight percent ratio of petroleum liquid to polymer in the novel mixture is about 1.05-40:1, typically about 1.1-20:1, more typically about 1.4-10:1, and even more typically about 1.6-5:1. As illustrated in Examples 7-8, the weight percent of the polymer in the novel mixture is generally greater than the weight percent of the TPU in the novel mixture; however, this is not required. When the weight percent of the polymer is greater than the weight percent of the TPU in the novel mixture, the weight percent ratio of polymer to TPU in the novel mixture is about 1.01-20:1, typically about 1.05-15:1, more typically about 1.1-10:1, and even more typically about 1.4-8:1. As also illustrated in Examples 7-8, the weight percent of the petroleum liquid in the novel mixture is generally greater than the combined weight percent of the polymer and the TPU in the novel mixture; however, this is not required. When the weight percent of the petroleum liquid is greater than the combined weight percent of the polymer and the TPU in the novel mixture, the weight percent ratio of petroleum liquid to polymer plus TPU in the novel mixture is about 1.01-10:1, typically about 1.05-8:1, more typically about 1.2-6:1, and even more typically about 1.4-5:1. The following examples were tested to test effects of adding a TPU to the novel mixture of the present invention:

| | Control | Example A | Example B | Example C |
|---|---|---|---|---|
| Asphalt PG-6422 | 40 wt. % | 40 wt. % | 40 wt. % | 40 wt. % |
| SBS - Kraton D1101KG | 18 wt. % | 15 wt. % | 12 wt. % | 7 wt. % |
| Filler - CaCO$_3$ | 42 wt. % | 42 wt. % | 42 wt. % | 42 wt. % |
| TPU - Elastollan 1185 | — | 3 wt. % | 6 wt. % | 10 wt. % |

For each of the above examples, the softening point, penetration, viscosity and low temperature flexibility were tested:

|  | Control | Example A | Example B | Example C |
|---|---|---|---|---|
| Softening Point (° F.) | 246 | 259 | 250 | 245 |
| Penetration | 22 | 23 | 21 | 15 |
| Viscosity (375° F., Brookfield LV Spindle 32, 0.3 RPM) | 42600 | 46200 | 53300 | 45000 |
| Low Temperature Flexibility (Pass ° F.) | −40 | −40 | −30 | 0 |

The results above illustrate that the addition of TPU to the novel mixture does not have a major effect on the viscosity of the novel mixture, even when the concentration of the TPU is as high as 10 wt. %. It was observed for the particular asphalt, SBS and TPU used in the novel mixture, a TPU concentration of about 6 wt. % and greater resulted in the cold flexibility of the novel mixture to begin to decrease. However, different types and amounts of petroleum liquid, TPU and polymer in the novel mixture of the present invention can result in larger weight percentages of TPU being able to be used in the novel mixture before the cold flexibility of the novel mixture is adversely affected.

Films of the Control mixture and the novel mixtures of Examples A and B were placed in accelerated weathering in accordance to ASTM D4798. After 500 hours of testing, the Control mixture showed cracking, while Example A showed greatly decreased cracking and Example B showed very faint signs of cracking.

The above test results establish that by incorporating thermoplastic polyurethanes (TPUs) into a petroleum liquid blend, the UV stability of the novel mixture of the present invention is improved and the properties of flexibility of traditional SBS-modified asphalt is retained. As such, the addition of TPUs in small amounts has been shown to greatly improve UV stability without compromising the cold temperature properties in addition to the added benefits of using TPUs as stated above. The novel mixture of the present invention does not require any extender oils to maintain the cold temperature flexibility properties of the novel mixture.

One non-limiting application of the novel mixture of the present invention is to coat at least one surface or impregnate throughout a scrim reinforcement composed of, but not limited to, polyester, fiberglass or polyester/fiberglass strands. In a non limiting example, the strands of the scrim reinforcement can be grouped in bidirectional (machine and cross machine direction). Once the strands are coated on at least one surface or impregnated throughout, any number of materials such as, but not limited to, crushed slag, mineral, sand, crushed glass can be deposited onto the surface of the coated and/or impregnated scrim reinforcement.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A prefabricated flexible membrane having high stability to ultraviolet (UV) exposure, said prefabricated flexible membrane comprising a fabric or mat material that includes a coating composition, said coating composition coated on at least one outer surface of said fabric or mat material, at least partially impregnated in said fabric or mat material, or combinations thereof, said coating composition comprising a petroleum liquid, polymer, and thermoplastic polyurethane, said petroleum liquid including one or more materials selected from the group consisting of asphalt, modified asphalt, bitumen, modified bitumen, coal-tar and modified coal tar, said polymer including one or more compounds selected from the group constituting of block polymer and plastomer, said polymer includes one or more compounds selected from the group consisting of Amorphous Poly-Alpha-Olefin (APAO), Atactic Polypropylene (APP), Ethylene-Vinyl Acetate (EVA), Polyphthalamide (PPA), Polymeric Polyisocyanate (PPI), Styrene-Ethylene/Butylene-Styrene (SEBS), Styrene-Butadiene-Styrene (SBS) and Styrene-Isoprene-Styrene(SIS), said thermoplastic polyurethane includes one or more compounds selected from the group consisting of polyether backbone Thermoplastic Polyurethane (TPU), polyester backbone TPU, polyether/polyester backbone TPU and polycarbonate backbone TPU.

2. The prefabricated flexible membrane as defined in claim 1, wherein said fabric or mat material is substantially fully impregnated with said coating material.

3. The prefabricated flexible membrane as defined in claim 1, wherein said polymer includes oil extended SBS.

4. The prefabricated flexible membrane as defined in claim 1, wherein said coating composition includes a filler, said filler includes one or more compounds selected from the group consisting of alumina trihydrate (ATH), calcium carbonate, chalk, clay, dolomite, kaolin, reinforced fibers, silica, talc, coloring agents, metal flakes, UV resistance agents, adhesion enhancers, fire retardants, biocides, oils and softening agents.

5. The prefabricated flexible membrane as defined in claim 1, wherein a weight percent of said petroleum liquid being greater than a weight percent of said polymer, said weight percent of said petroleum liquid being greater than a weight percent of said thermoplastic polyurethane.

6. The prefabricated flexible membrane as defined in claim 5, wherein said weight percent of said polymer is greater than said weight percent of said thermoplastic polyurethane, said weight percent of said petroleum liquid is greater than a combined weight percent of said polymer and said thermoplastic polyurethane.

7. The prefabricated flexible membrane as defined in claim 1, comprising by weight percent:

| Petroleum Liquid | 30-80 wt. % |
|---|---|
| Polymer | 0.5-40 wt. % |
| Thermoplastic polyurethane | 0.1-25 wt. % |
| Filler and/or additives | 0-69.4 wt. %. |

8. The prefabricated flexible membrane as defined in claim 1, comprising by weight percent:

| | |
|---|---|
| Petroleum Liquid | 30-80 wt. % |
| Polymer | 1-40 wt. % |
| Thermoplastic polyurethane | 0.1-15 wt. % |
| Filler and/or additives | 0-68.9 wt. %. |

9. The prefabricated flexible membrane as defined in claim 1, comprising by weight percent:

| | |
|---|---|
| Petroleum Liquid | 30-80 wt. % |
| Polymer | 1-40 wt. % |
| Thermoplastic polyurethane | 0.1-9 wt. % |
| Filler and/or additives | 0-68.9 wt. %. |

10. The prefabricated flexible membrane as defined in claim 1, comprising by weight percent:

| | |
|---|---|
| Petroleum Liquid | 30 to less than 40 wt. % |
| Polymer | 1-40 wt. % |
| Thermoplastic polyurethane | 0.1-15 wt. % |
| Filler and/or additives | 6-68.9 wt. %. |

11. The prefabricated flexible membrane as defined in claim 1, comprising by weight percent:

| | |
|---|---|
| Petroleum Liquid | 30-80 wt. % |
| Polymer | 1-25 wt. % |
| Thermoplastic polyurethane | 0.5-15 wt. % |
| Filler and/or additives | 0-68.5 wt. %. |

12. The prefabricated flexible membrane as defined in claim 1, comprising by weight percent:

| | |
|---|---|
| Asphalt | 30-75 wt. % |
| APP, SEBS, SBS and/or SIS | 5-20 wt. % |
| Thermoplastic polyurethane | 0.5-10 wt. % |
| Filler and/or additives | 0-64.5 wt. %. |

13. The prefabricated flexible membrane as defined in claim 1, comprising by weight percent:

| | |
|---|---|
| Asphalt | 30-70 wt. % |
| SEBS and/or SBS | 8-18 wt. % |
| Polyether backbone TPU | 1-9 wt. % |
| Filler and/or additives | 4-50 wt. %. |

14. The prefabricated flexible membrane as defined in claim 1, comprising by weight percent:

| | |
|---|---|
| Asphalt | 35-65 wt. % |
| SBS | 10-16 wt. % |
| Polyether backbone TPU | 2-8 wt. % |
| Filler and/or additives | 12-50 wt. %. |

15. The prefabricated flexible membrane as defined in claim 1, wherein a weight percent ratio of said petroleum liquid to said polymer is about 1.05-40:1.

16. The prefabricated flexible membrane as defined in claim 1, wherein a weight percent ratio of said polymer to said TPU is about 1.01-20:1.

17. The prefabricated flexible membrane as defined in claim 15, wherein a weight percent ratio of said polymer o said TPU is about 1.01-20:1.

18. The prefabricated flexible membrane as defined in claim 1, wherein a weight percent ratio of said petroleum liquid to a combined weight percent of said polymer and said TPU is about 1.01-10:1.

19. The prefabricated flexible membrane as defined in claim 17, wherein a weight percent ratio of said petroleum liquid to a combined weight percent of said polymer and said TPU is about 1.01-10:1.

20. A prefabricated flexible membrane having high stability to ultraviolet (UV) exposure, said prefabricated flexible membrane comprising a fabric or mat material that includes a coating composition, said fabric or mat material is substantially fully impregnated with said coating material, said coating composition comprising a petroleum liquid, polymer, and thermoplastic polyurethane, said petroleum liquid including one or more materials selected from the group consisting of asphalt, modified asphalt, bitumen, modified bitumen, coaltar and modified coal tar, said polymer including one or more compounds selected from the group constituting of block polymer and plastomer, said polymer includes one or more compounds selected from the group consisting of Amorphous Poly-Alpha-Oletin (APAO), Atactic Polypro ylene (APP), Ethylene-Vinyl Acetate (EVA), Polyphthalamide (PPA), Polymeric Polyisocyanate (PPI), Styrene-Ethylene/Butylene-Styrene (SEBS), Styrene-Butadiene-Styrene (SBS) and Styrene-Isoprene-Styrene(SIS), said thermoplastic polyurethane includes one or more compounds selected from the group consisting of polyether backbone Thermoplastic Polyurethane (TPU), polyester backbone TPU, polyether/polyester backbone TPU and polycarbonate backbone TPU, a weight percent ratio of said petroleum liquid to said polymer is about 1.05-40:1, a weight percent ratio of said polymer to said TPU is about 1.01-20:1, a weight percent ratio of said petroleum liquid to a combined weight percent of said polymer and said TPU is about 1.01-10:1.

21. The prefabricated flexible membrane as defined in claim 20, wherein said coating composition includes a tiller, said tiller includes one or more compounds selected from the group consisting of alumina trihydrate (ATH), calcium carbonate, chalk, clay, dolomite, kaolin, reinforced fibers, silica, talc, coloring agents, metal flakes, UV resistance agents, adhesion enhancers, fire retardants, biocides, oils and softening agents.

22. The prefabricated flexible membrane as defined in claim 20, comprising by weight percent:

| | |
|---|---|
| Petroleum Liquid | 30-80 wt. % |
| Polymer | 0.5-40 wt. % |
| Thermoplastic polyurethane | 0.1-25 wt. % |
| Filler and/or additives | 0-69.4 wt. %. |

23. The prefabricated flexible membrane as defined in claim 20, comprising by weight percent:

| | |
|---|---|
| Petroleum Liquid | 30-80 wt. % |
| Polymer | 1-40 wt. % |
| Thermoplastic polyurethane | 0.1-15 wt. % |
| Filler and/or additives | 0-68.9 wt. %. |

24. The prefabricated flexible membrane as defined in claim 20, comprising by weight percent:

| | |
|---|---|
| Petroleum Liquid | 30-80 wt. % |
| Polymer | 1-40 wt. % |
| Thermoplastic polyurethane | 0.1-9 wt. % |
| Filler and/or additives | 0-68.9 wt. %. |

25. The prefabricated flexible membrane as defined in claim 20, comprising by weight percent:

| | |
|---|---|
| Petroleum Liquid | 30 to less than 40 wt. % |
| Polymer | 1-40 wt. % |
| Thermoplastic polyurethane | 0.1-15 wt. % |
| Filler and/or additives | 6-68.9 wt. %. |

26. The prefabricated flexible membrane as defined in claim 20, comprising by weight percent:

| | |
|---|---|
| Petroleum Liquid | 30-80 wt. % |
| Polymer | 1-25 wt. % |
| Thermoplastic polyurethane | 0.5-15 wt. % |
| Filler and/or additives | 0-68.5 wt. %. |

27. The prefabricated flexible membrane as defined in claim 20, comprising by weight percent:

| | |
|---|---|
| Asphalt | 30-75 wt. % |
| APP, SEBS, SBS and/or SIS | 5-20 wt. % |
| Thermoplastic polyurethane | 0.5-10 wt. % |
| Filler and/or additives | 0-64.5 wt. %. |

28. The prefabricated flexible membrane as defined in claim 20, comprising by weight percent:

| | |
|---|---|
| Asphalt | 30-70 wt. % |
| SEBS and/or SBS | 8-18 wt. % |
| Polyether backbone TPU | 1-9 wt. % |
| Filler and/or additives | 4-50 wt. %. |

29. The prefabricated flexible membrane as defined in claim 20, comprising by weight percent:

| | |
|---|---|
| Asphalt | 35-65 wt. % |
| SBS | 10-16 wt. % |
| Polyether backbone TPU | 2-8 wt. % |
| Filler and/or additives | 12-50 wt. %. |

30. The prefabricated flexible membrane as defined in claim 20, wherein said weight percent ratio of said petroleum liquid to said polymer is about 1.6-5:1.

31. The prefabricated flexible membrane as defined in claim 20, wherein said weight percent of said polymer to said TPU is about 1.4-8:1.

32. The prefabricated flexible membrane as defined in claim 31 wherein said weight percent of said polymer to said TPU is about 1.4-8:1.

33. The prefabricated flexible membrane as defined in claim 20, wherein said weight percent of said petroleum liquid to said combined weight percent of said polymer and said TPU is about 1.4-5:1.

34. The prefabricated flexible membrane as defined in claim 33, wherein said weight percent of said petroleum liquid to said combined weight percent of said polymer and said TPU is about 1.4-5:1.

\* \* \* \* \*